Feb. 23, 1971 — M. F. SMITH — 3,564,852
FLEXIBLE FLOATING BOOMS
Filed Aug. 25, 1969 — 2 Sheets-Sheet 1

INVENTOR.
MILLARD F. SMITH
BY Robert H. Ware
ATTORNEY

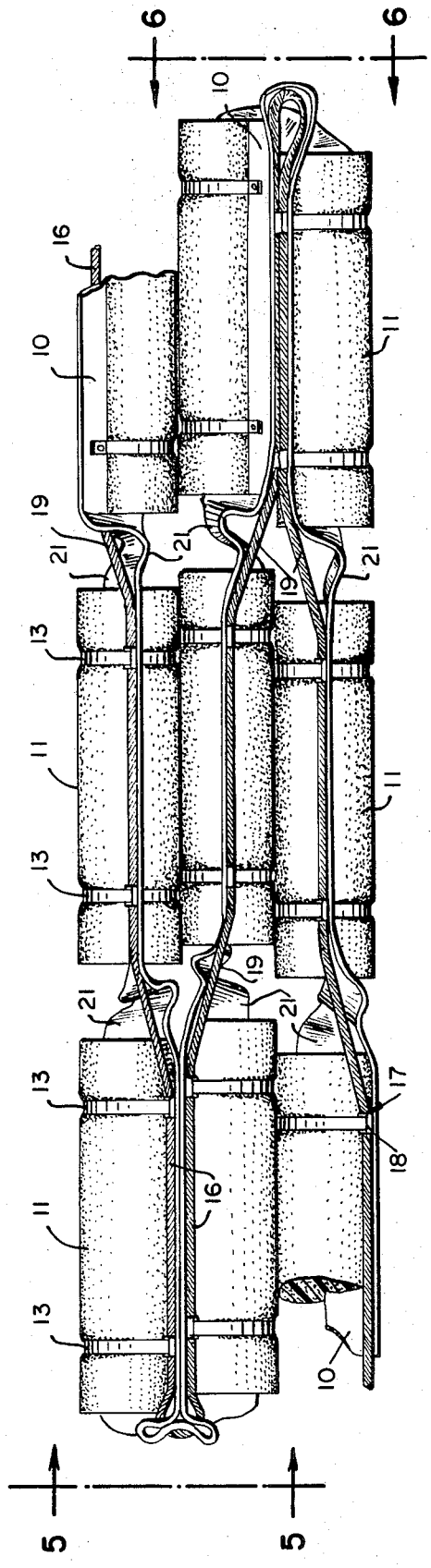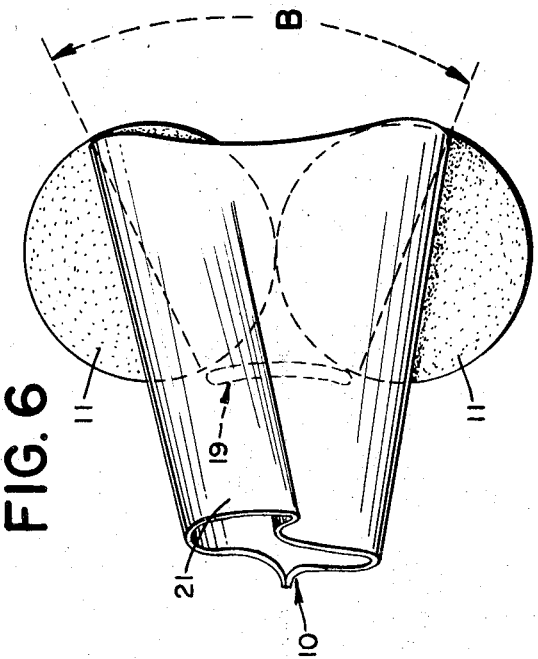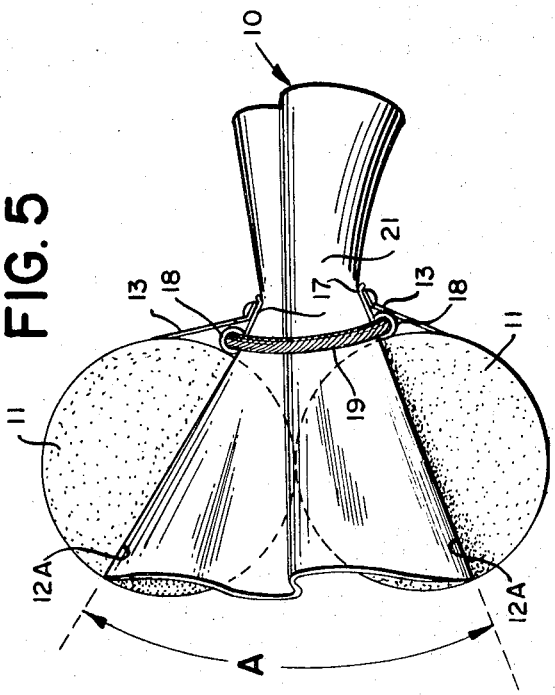

United States Patent Office 3,564,852
Patented Feb. 23, 1971

3,564,852
FLEXIBLE FLOATING BOOMS
Millard F. Smith, Westport, Conn.
(P.O. Box 295, Saugatuck, Conn. 06882)
Filed Aug. 25, 1969, Ser. No. 852,776
Int. Cl. E02b 3/04, 15/04
U.S. Cl. 61—1
6 Claims

ABSTRACT OF THE DISCLOSURE

A supple, flexible, floating oil boom, self-reinforced by a taut, integral, high-tensile-strength, multiple-strand stainless steel cable anchored centrally at longitudinally spaced points to a thin, flat, flexible polymer fin. The fin is arrayed "standing on edge" in a generally vertical position, and the cable is anchored to the fin at a level adjacent to the undersides of longitudinally spaced-apart buoyant floats likewise anchored to the flat continuous fin along its upper edge. The cable is held just beneath the water surface when the boom is afloat, with ballast weights anchored along its lower edge holding the boom upright. In the regions between the buoyant floats, the fin is provided with excess slack length forming loosely curved bights of extra fin material, having a greater length than the corresponding segment of taut reinforcing cable, and providing extreme flexing capability in all directions. The excess slack fin bight between floats permits sharply bent flexing of the boom to conform closely to the crest or trough of a steep wave while maintaining full tension on the taut reinforcing cable. The boom is likewise capable of sharply-bent, sidewise lateral flexing in response to waves, turbulence, impacts or manual accordion-folding operations.

---

This invention relates to floating oil booms employed to enclose and confine a body of floating oil resulting from an oil leak or an oil spill on a water surface, such as might occur at a refinery anchorage or an oil terminal harbor, or an offshore oil spill caused by accident, damage or a tanker collision at sea. The unique design of the booms of this invention permits them to flex with supple freedom in all directions. They may flex sharply in a vertical plane to follow short steep wave contours, and they may flex freely in a lateral plane for accordion-folded flaked stowage.

BACKGROUND OF THE INVENTION

The long historical development of "booms" for confining floating materials traces its evolution from log booms confining floating logs arriving at a sawmill, and includes many heavy, awkward floating structures proposed for confining floating oil. Most of these prior suggestions involved cork and canvas floats, metal hinges and similar bulky, heavy and awkward structures. My patent, U.S. Pat. No. 3,146,598, issued Sept. 1, 1964, discloses my "Slickbar" oil boom in its basic form, comprising a continuous elongated polymer fin with a plurality of buoyant floats positioned along the upper fin edge sufficiently spaced apart longitudinally to permit accordion-folding for storage of the boom. My U.S. patent application Ser. No. 739,452, filed June 24, 1968, now U.S. Pat. No. 3,499,290, discloses a heavy duty cable-reinforced floating boom for use in confining oil where current drift, wind velocity or wave action impose high load stresses upon the boom structure. The reinforcing cable 33 there disclosed is positioned closely adjacent to the undersides of spaced-apart buoyant floats 21 just beneath the waterline, and lies flat beside the continuous polymer fin, providing extremely high load-carrying ability contributed by the high tensile strength of the cable while achieving maximum elongation of the boom, with both the boom fin and the cable being stretched relatively taut as a single unitary structure.

SUMMARY OF THE INVENTION

I have now discovered that several additional advantages are achieved by a modified boom structure constituting an improvement over my previous floating booms. This improvement involves anchoring a high strength steel reinforcing cable along one side of a polymer fin closely adjacent to the undersides of longitudinally spaced-apart buoyant floats while providing excess fin lengths, slightly greater than the corresponding cable lengths, in the short boom regions between the ends of the adjacent floats. In this manner these excess lengths of fin form loosely curved bights of extra fin material adjacent to the shorter taut length of reinforcing cable spanning the space between each pair of adjacent floats.

This excess fin length facilitates flexing of the resulting boom structure in all directions. Sharp vertical flexing conforms the boom to the troughs and crests of steep, choppy waves, allowing the boom to follow shifting wave contours closely while maintaining its depending ballasted fin in a highly effective, downwardly projecting, oil-confining position. In a similar manner the excess fin lengths and short cable segments spanning between adjacent floats facilitate extremely tight accordion-folding and stowage of this improved boom structure, and permits adjacent floats to be spaced more closely together than in prior booms, providing enhanced buoyancy without reducing accordion-folding stowage capability.

Accordingly a principal object of the present invention is to provide unusually supple floating booms for confining floating material, capable of flexure freely in all directions.

Another object of the invention is to provide such floating booms incorporating high strength reinforcing cable.

A further object of the invention is to provide such floating booms with a plurality of buoyant floats spaced apart longitudinally at close intervals, with an excess length of continuous fin material between the ends of the adjacent floats, permitting tight accordion-folding of the overall boom structure for extremely compact stowage.

Other and more specific objects will be apparent from the features, elements, combinations and operating procedures disclosed in the following detailed description and shown in the drawings.

THE DRAWINGS

FIG. 4 is a fragmentary schematic view of a portion of the boom of FIGS. 1 and 2, flaked in accordion-folded segments for stowage;

FIGS. 5 and 6 are fragmentary enlarged end elevation views of portions of the flaked boom shown in FIG. 4 taken respectively along the lines 5—5 and 6—6 shown in FIG. 4.

Figure 1:
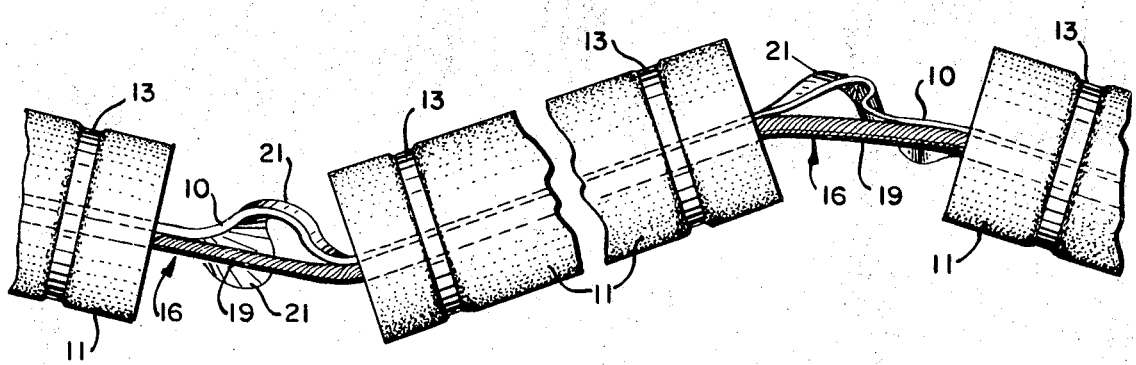
FIG. 1 is a fragmentary top plan view of the central portion of a floating boom incorporating the features and advantages of the present invention, showing its lateral flexing capability.
Figure 2:
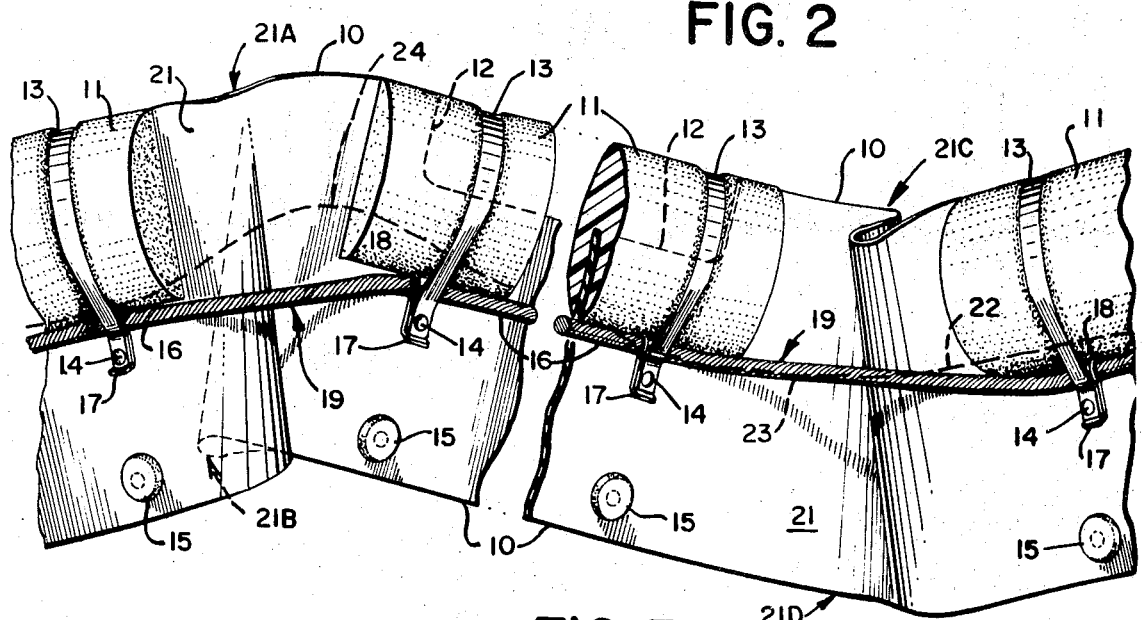
FIG. 2 is a fragmentary side elevation view partially broken away showing a similar central portion of the floating boom of FIG. 1, showing its vertical flexing capability.

The floating booms of the kind illustrated in FIGS. 1 and 2 to be used for confining floating materials such as spilled oil incorporate a continuous polymer fin 10 preferably formed of thin bendable vinyl sheet material such as ⅛ inch thick or 3/16 inch thick polyvinyl chloride sheet. The fin 10 is a wide elongated continuous strip, which may be 12 inches, 18 inches, 24 inches or more in width, depending upon anticipated operating conditions and the depth of the oil layer to be confined. Suitable end fittings are provided at each end of the boom fin 10, such as those disclosed in my pending application Serial No. 739,452.

Arrayed along the upper edge of fin 10 are a spaced plurality of buoyant floats 11. The floats may be formed as semi-cylindrical bodies of foamed polymer material positioned in mating pairs on opposite sides of the upper edge of fin 10 at spaced intervals. Alternatively, as indicated in FIG. 2 each buoyant float 11 may be formed of a cylindrical body of foamed polymer material having a lower fin-receiving slot formed therein along a radial plane, widening out to form an end slot 12a extending across the full vertical diameter of the cylindrical foam body 11. A corresponding notch cut from the upper edge of fin 10 cooperates with slot 12–12a, allowing the buoyant float 11 to be telescoped downward into sandwiched relationship enclosing both sides of the upper edge of fin 10, with the unslotted body of buoyant float 11 positioned within the corresponding notch in the upper edge of fin 10.

It is desirable for the upper edge of floats 11 to coincide substantially with the upper edge of fin 10, providing a continuous upper edge for the assembled boom structure of substantially uniform height. Floats of different shapes may be used, but buoyant, foamed polymer floats having a substantially cylindrical shape and a circular cross section have proved to be highly suitable. Such cylindrical floats present maximum streamlining and minimum windage or exposed surface area. These cylindrical floats thus minimize sidewise drift produced by crosswinds. In addition, buoyant floats 11 of substantially circular cross section are dimensioned to float "high," with only a small lower portion of the float bodies 11 being submerged under normal operating conditions. Arriving surface waves or turbulence tend to submerge a greater wetted depth of the buoyant float 11, displacing an increasing volume of buoyant float material for each vertical increment of greater immersion, and thus producing instantly increased buoyancy at the exact point where the rising wave crest intercepts the boom.

As indicated in FIGS. 1 and 2, buoyant floats 11 are preferably anchored firmly to fin 10 by a plurality of straps 13 which may be formed of sheet polymer strip material or of stainless steel bands. The straps 13 are draped in a U-shaped condition over the upper surface of each buoyant float 11 at the desired intervals, and the lower ends of straps 13 are drawn inwardly together flanking fin 10 directly beneath the lower edge of the buoyant float 11, to be clamped together by suitable clamping means such as stainless steel rivets 14. Heat-deformed polymer rivets or other fastening devices may be used for this purpose if desired. Ballast weights 15 are anchored near the lower edge of fin 10 to position the fin in substantially vertical orientation.

A continuous high tensile strength reinforcing cable 16, preferably a multiple strand stainless steel cable, is securely clamped in taut condition arrayed along the undersides of buoyant floats 11. Cable 16 is preferably clamped in position by encircling clips 17 having their upper end portions 18 curled and swaged about the cable, one clip 17 being secured in fixed relation to each respective strap member 13. For this purpose the clip 17 is provided with a rivet-receiving hole whereby, simultaneously with the assembly of the fin and floats, each clip 17 may be interposed and clamped by the rivet 14 between one end portion of each strap member 13 and the adjacent side face of the fin 10, with the curled, swaged end 18 of clip 17 clamped about cable 16 in the space defined by one side leg of the strap 13 at one side of the fin 10 adjacent the underside of the float 11. The lower marginal portion of the clip 17 is preferably bent outwardly to provide an outwardly and downwardly inclined flange disposed beneath the end portion of the strap 13 in the assembled boom structure. The flange is provided with rounded ends and edges to avoid marring or damage to the adjacent polymer boom components.

EXCESS FIN LENGTH BETWEEN FLOATS

Figure 3:
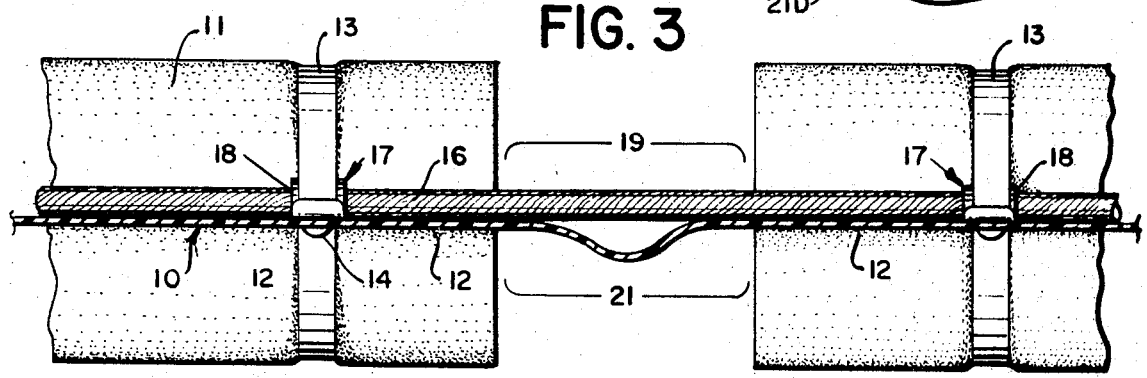
FIG. 3 is a fragmentary enlarged bottom plan view of a portion of the boom of FIGS. 1 and 2, illustrating the details of the boom structure providing excess fin lengths between the ends of adjacent floats.

As shown in the drawings, and particularly in the bottom view of FIG. 3, the segment 19 of reinforcing cable 16 spanning the space between the facing ends of two adjacent boom floats 11 is preferably dimensioned to have a length slightly less than the overall width or diameter of the buoyant floats 11. The corresponding segment 21 of fin 10, extending between the same facing ends of adjacent buoyant floats 11, is dimensioned to have a length slightly greater than the corresponding length of spanning cable segment 19. Being considerably more flexible and supple than the reinforcing cable 19, this excess length of fin segment 21 normally buckles to form a loosely bent slack bight, providing ample fin material between each pair of adjacent floats 11 to permit skewing, flexing and bending of the boom structure in all directions, in the manner of a concertina.

Thus, as shown schematically in FIG. 1, the slack bights 21 customarily arch and buckle to permit the boom to flex sidewise in angular or sawtooth configuration under lateral impacts, wind loads, waves or any other sidewise load imposed upon the boom structure. The sidewise articulated flexing of the boom illustrated in FIG. 1 need not reduce and may increase the tensile load carried by the reinforcing cable 16, which may remain substantially taut between each adjacent pair of floats.

The slack bight 21 of the fin 10 is not long enough to droop in an elongated downward loop, and remains arrayed in a substantially vertical position despite vertical or lateral flexing, maintaining a continuous barrier between adjacent floats 11, confining the floating oil or other floating material which the boom is intended to confine with high effectiveness. Suitable lengths for the fin segment 21 as compared with the corresponding cable segment 19 provide from 5% to 40% extra length in the fin segment 21, and the inherent stiffness of the thin bendable polymer sheet material normally used for the continuous fin 10 customarily permits bending in only one "degree of freedom" thus minimizing "compound curvature" of the fin segment 21. Accordingly, as indicated in FIGS. 1 and 2, the slack bight 21 is maintained upright in an arched or S-folded shape spanning the space between adjacent floats 11 in all articulated positions thereof.

The water level 22 shown as a dashed line in FIG. 2 has a typical trough 23 at the righthand side of FIG. 2, and a typical crest 24 at the lefthand side of FIG. 2. As indicated in that figure, the two floats 11 flanking the crest 24 are free to flex relatively at a sharp downward facing acute angle, thus following the short, steep contour of such a choppy water surface. This "vertical" flexing is achieved by reason of the free flexing of the excess length fin segment 21 doubled back upon itself beneath the water surface while the segment 19 of the reinforcing cable 16 transmits its tensile load via clips 17 from one float 11 across the sharply flexed unbuoyed space to the adjacent buoyant float 11. FIG. 2 clearly shows that the transverse planes defined by the transverse ends of the floats 11 flanking crest 24 diverge upwardly, stretching excess length 21 of fin 10 relatively taut along its upper edge 21A while overlapping excess fin length 21 along its lower edge 21B. Correspondingly at trough 23, the fin section 21 is doubled back upon itself above the water line along its upper edge 21C to provide similar flexing of the adjacent floats in an upward facing acute angle, and the fin segment 21 is supply flexed across its width and stretched almost taut along its lower edge 21D to provide excellent conformance with the choppy water surface.

In one suitable embodiment of the booms of this invention, the floats 11 formed as right circular cylinders having a diameter of eight inches and are fabricated of resilient, buoyant closed cell polyethylene foamed material. The cable segment 19 spanning the space between adjacent floats 11 in this embodiment is approximately seven inches in length, while the corresponding slack bight length 21 of fin 10 is approximately eight and one half inches in length. In another embodiment of the invention, where the cable segment 19 spanning the space between the facing ends of the adjacent floats is 12 inches long, the slack bight 21 of spanning fin material is 13.5 inches long.

To assure maximum capability for boom conformance with wave trough and crests in short choppy seas, relatively short length floats 11 are preferably employed. An 8 inch diameter float 11 may have a 24 inch length, for example.

COMPACT ACCORDION-FOLDING CAPABILITY

The schematic diagram of FIG. 4 shows parallel segments of a boom of the present invention accordion-folded in unusually compact condition. The compactness of the folded boom is a result of the close spacing of the facing ends of adjacent floats 11, since the short spanning segment 19 of reinforcing cable 16 confines and "bunches" the adjacent span segment of polymer fin segment 21 at the left end of the folded boom structure. As shown in FIGS. 4 and 5, the adjacent boom segments joined by folds at the left end of FIG. 4 have their inter-float fin segments 21 encircled by the inter-float cable segment 19, thus closely confining the spanning segment 21 of the fin 10 within the encircling band of the closely bent short length 19 of cable 16.

At the opposite righthand end of the folded tiers or segments of the boom shown at the righthand side of FIG. 4, and also in FIG. 6, inter-float segments 19 of cable 16 loop inside the free length 21 of fin 10 spanning the space between the adjacent floats 11 flanking the fold. The short length of cable 19 has the effect of positioning these adjacent floats 11 close together in the same manner that the cable segment 19 performs the same close spacing function at the lefthand side of the folded boom segments shown in FIG. 4. Accordingly as successive segments of the boom are accordion-folded they assume "flaked" successively arrayed positions nestled closely against the boom segments previously folded. The floats 11 are free to rotate coaxially as they are placed in their accordion-folded position shown in FIG. 4, and as a result the successive floats 11 may align themselves by slightly twisting their inter-float fin segments 21 as shown in FIG. 4 to accommodate the restraining or "harnessing" effects of the cable segments 19 falling at the ends or folds of the accordion-folded assembly; thus floats 11 normally exhibit relative angular displacement as compared to the adjacent float 11, bringing the plane of the fin 10 emerging from each end float into a closely converging relationship with the plane of fin 10 entering the adjoining float beyond the sharp 180° accordion-fold. The converging planes of these adjacent fin segments flanking the end-folds are shown schematically by the angle A in FIG. 5 and by the similar angle B in FIG. 6.

Examination of these figures shows that the length 21 of fin 10 spanning the space between the facing ends of adjacent floats 11 may preferably be slightly greater than the float diameter or maximum float width, while the corresponding length of the spanning segment 19 of reinforcing cable 16 extending between the facing ends of adjacent floats 11 may be correspondingly smaller than the diameter or width of the floats 11, in order to produce the desired "harnessing" effect of the short length of cable segment 19 in drawing together the accordion-folded boom segments into a tight, compacted, flaked configuration for storage.

Since the foregoing description and drawings are merely illustrative, the scope of the invention has been broadly stated herein and it should be liberally interpreted so as to obtain the benefit of all equivalents to which the invention is fairly entitled.

What is claimed is:
1. A floating boom comprising:
   (A) a continuous elongated flexible fin having upper and lower marginal edges,
   (B) a series of buoyant floats secured in longitudinally spaced end-to-end relation along the upper marginal edge of the fin with flexible inter-float segments of the fin extending between the adjacent ends of the floats with their upper edges substantially level with the upper sides of the floats,
   (C) and a continuous reinforcing cable extending along one side of the fin and anchored thereto adjacent the undersides of the series of floats,
   (D) with each flexible inter-float fin segment being substantially longer than an adjacent inter-float segment of the reinforcing cable spanning each longitudinal space between adjacent float ends,
whereby the boom is capable of sharply buckled flexure in all directions adapting it for conforming to steep wave contours and for achieving tightly compacted accordion-folded boom stowage.

2. The floating boom defined in claim 1, further including a plurality of ballast weights anchored to the fin near its lower marginal edge, cooperating with the buoyant force supplied by the floats to orient the fin in a substantially vertical position.

3. The floating boom defined in claim 1 wherein the inter-float cable segments are substantially shorter in length than the overall lateral width of the adjacent buoyant floats.

4. The floating boom defined in claim 1 wherein the buoyant floats along the upper fin edge form right circular cylindrical buoyant portions of the boom, with the flexible fin coinciding with and extending downward along a vertical radial plane of the cylindrical portions.

5. The floating boom defined in claim 1 wherein each inter-float fin segment length exceeds by an amount between about 5% and about 40% the adjacent inter-float cable segment length.

6. The floating boom defined in claim 1 wherein the inter-float fin segment length exceeds by an amount between about 10% and about 20% the adjacent inter-float cable segment length.

References Cited
UNITED STATES PATENTS

| 2,240,567 | 5/1941 | Meacham et al. | 61—1 |
| 3,499,290 | 3/1970 | Smith. | |

FOREIGN PATENTS

| 189,188 | 1964 | Sweden | 61—1 |

JACOB SHAPIRO, Primary Examiner